(12) United States Patent
Willy et al.

(10) Patent No.: US 9,630,140 B2
(45) Date of Patent: Apr. 25, 2017

(54) METHOD FOR ABSORBING $CO_2$ FROM A GAS MIXTURE

(71) Applicant: Evonik Degussa GmbH, Essen (DE)

(72) Inventors: Benjamin Willy, Düsseldorf (DE); Stefanie Rinker, Hünxe (DE); Manfred Neumann, Marl (DE); Jochen Niemeyer, Münster (DE); Michael Keup, Marl (DE); Daniel Witthaut, Langenselbold (DE); Matthias Seiler, Düsseldorf-Unterbach (DE); Jörn Rolker, Alzenau (DE); Rolf Schneider, Gründau-Rothenbergen (DE); Daniel Dembkowski, Essen (DE); Volker Brehme, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 50 days.

(21) Appl. No.: 14/399,139

(22) PCT Filed: Apr. 22, 2013

(86) PCT No.: PCT/EP2013/058288
§ 371 (c)(1),
(2) Date: Nov. 5, 2014

(87) PCT Pub. No.: WO2013/167367
PCT Pub. Date: Nov. 14, 2013

(65) Prior Publication Data
US 2015/0125373 A1 May 7, 2015

(30) Foreign Application Priority Data

May 7, 2012 (DE) .......................... 10 2012 207 509

(51) Int. Cl.
*B01D 53/62* (2006.01)
*B01D 53/14* (2006.01)
(Continued)

(52) U.S. Cl.
CPC ..... *B01D 53/1475* (2013.01); *B01D 53/1493* (2013.01); *B01D 53/62* (2013.01); *C10L 3/104* (2013.01); *B01D 2252/20442* (2013.01); *B01D 2252/20447* (2013.01); *B01D 2252/20452* (2013.01); *B01D 2252/20478* (2013.01); *B01D 2252/502* (2013.01); *B01D 2256/24* (2013.01); *B01D 2257/504* (2013.01);
(Continued)

(58) Field of Classification Search
None
See application file for complete search history.

(56) References Cited

U.S. PATENT DOCUMENTS 1,882,258 A 10/1932 Randel
2,516,625 A 7/1950 Haury
(Continued)

FOREIGN PATENT DOCUMENTS

CA 2817704 * 5/2012 ............. B01D 53/14
CN 1076380 A 9/1993
(Continued)

OTHER PUBLICATIONS

English translation of the International Search Report for corresponding international application PCT/EP2013/058288 filed Apr. 22, 2013.
English language translation of the Written Opinion of the International Searching Authority for corresponding application PCT/EP2013/058288 filed Apr. 22, 2013.
English language translation of the International Preliminary Report on Patentability for corresponding international application PCT/EP2013/058288 filed Apr. 22, 2013.
Brennecke, et al., "Ionic Liquids: Innovative Fluids for Chemical Processing," *AIChE Journal* 47(11):2384-2389 (Nov. 2001).
(Continued)

*Primary Examiner* — Daniel Berns
(74) *Attorney, Agent, or Firm* — Law Office of: Michael A. Sanzo, LLC

(57) ABSTRACT

In a method of absorbing $CO_2$ from a gas mixture the use of an absorption medium comprising water and at least one amine of formula (I)

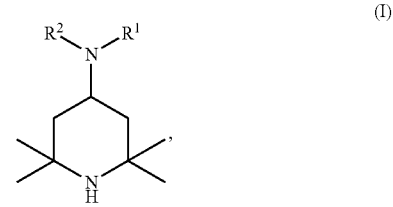

(I)

where
$R^1$ is a —$(CH_2)_n$—$(XCH_2CH_2)_m$—Y—$R^3$ radical where $R^3$=hydrogen or an alkyl radical having from 1 to 6 carbon atoms,
X and Y are each, independently of one another, $NR^3$, oxygen, SO or $SO_2$, where in the case of Y=SO and in the case of Y=$SO_2$, $R^3$ is not hydrogen, and Y—$R^3$ can be an N-morpholinyl radical or an N-piperazyl radical,
$n$=2 to 4,
$m$=0 to 4 and
$R^2$ is hydrogen, an alkyl radical having from 1 to 6 carbon atoms or a radical $R^1$,
where m is not 0 when $R^2$ is not a radical $R^1$, Y=$NR^3$ and Y—$R^3$ is not an N-morpholinyl radical and not an N-piperazyl radical,
makes it possible to avoid precipitation of a solid during the absorption of $CO_2$ and a separation into two liquid phases during the regeneration of the absorption medium.

16 Claims, No Drawings

(51) Int. Cl.
*B01D 53/78* (2006.01)
*B01D 53/96* (2006.01)
*C10L 3/10* (2006.01)

(52) U.S. Cl.
CPC .......... B01D 2258/025 (2013.01); B01D 2258/0233 (2013.01); B01D 2258/0283 (2013.01); B01D 2258/05 (2013.01); C10L 2290/541 (2013.01); Y02C 10/06 (2013.01)

(56) References Cited

U.S. PATENT DOCUMENTS

| | | | |
|---|---|---|---|
| 2,601,673 | A | 6/1952 | McMillan |
| 2,802,344 | A | 8/1957 | Witherell |
| 3,137,654 | A | 6/1964 | Johnson et al. |
| 3,276,217 | A | 10/1966 | Bourne et al. |
| 3,580,759 | A | 5/1971 | Albertson et al. |
| 3,609,087 | A | 9/1971 | Chi et al. |
| 4,094,957 | A | 6/1978 | Sartori et al. |
| 4,106,904 | A | 8/1978 | Oude Alink et al. |
| 4,112,051 | A | 9/1978 | Sartori et al. |
| 4,152,900 | A | 5/1979 | Chopra et al. |
| 4,152,901 | A | 5/1979 | Munters |
| 4,201,721 | A | 5/1980 | Hallgren |
| 4,217,238 | A | 8/1980 | Sartori et al. |
| 4,251,494 | A | 2/1981 | Say |
| 4,360,363 | A | 11/1982 | Ferrin et al. |
| 4,405,579 | A | 9/1983 | Sartori et al. |
| 4,405,586 | A | 9/1983 | Sartori et al. |
| 4,466,915 | A | 8/1984 | Lai |
| 4,524,587 | A | 6/1985 | Kantor |
| 4,605,743 | A | 8/1986 | Malz et al. |
| 4,643,000 | A | 2/1987 | Rheinfelder |
| 4,701,530 | A | 10/1987 | Swearingen et al. |
| 4,714,597 | A | 12/1987 | Trevino |
| 4,889,938 | A | 12/1989 | Kristen et al. |
| 5,016,445 | A | 5/1991 | Wehr |
| 5,126,189 | A | 6/1992 | Tanny et al. |
| 5,186,009 | A | 2/1993 | Rockenfeller |
| 5,186,010 | A | 2/1993 | Wehr |
| 5,255,534 | A | 10/1993 | Ryan |
| 5,303,565 | A | 4/1994 | Pravda |
| 5,390,509 | A | 2/1995 | Rockenfeller et al. |
| 5,873,260 | A | 2/1999 | Linhardt et al. |
| 6,117,963 | A | 9/2000 | Boinowitz et al. |
| 6,128,917 | A | 10/2000 | Riesch et al. |
| 6,130,347 | A | 10/2000 | Julius et al. |
| 6,155,057 | A | 12/2000 | Angell et al. |
| 6,165,433 | A | 12/2000 | Chakravarti et al. |
| 6,184,433 | B1 | 2/2001 | Harada et al. |
| 6,423,282 | B1 | 7/2002 | Araki et al. |
| 6,475,370 | B2 | 11/2002 | Lehmann et al. |
| 6,672,099 | B1 | 1/2004 | Yoshimi et al. |
| 6,680,047 | B2 | 1/2004 | Klaveness et al. |
| 6,727,015 | B1 | 4/2004 | Putter et al. |
| 7,419,646 | B2 | 9/2008 | Cadours et al. |
| 7,435,318 | B2 | 10/2008 | Arlt et al. |
| 7,666,813 | B2 | 2/2010 | Hoefer et al. |
| 7,754,053 | B2 | 7/2010 | Maase |
| 7,827,820 | B2 | 11/2010 | Weimer et al. |
| 8,069,687 | B2 | 12/2011 | Jork et al. |
| 8,167,983 | B2 | 5/2012 | Seiler et al. |
| 8,277,615 | B2 | 10/2012 | Ruffert et al. |
| 8,318,117 | B2 | 11/2012 | Lichtfers et al. |
| 8,357,344 | B2 | 1/2013 | Bouillon et al. |
| 8,362,095 | B2 | 1/2013 | Schwab et al. |
| 8,382,962 | B2 | 2/2013 | Massonne et al. |
| 8,470,079 | B2 | 6/2013 | Agar et al. |
| 8,500,867 | B2 | 8/2013 | Seiler et al. |
| 8,500,892 | B2 | 8/2013 | Seiler et al. |
| 8,506,839 | B2 | 8/2013 | Shiflett et al. |
| 8,523,978 | B2 | 9/2013 | Rojey et al. |
| 8,623,123 | B2 | 1/2014 | Seiler et al. |
| 8,696,928 | B2 | 4/2014 | Seiler et al. |
| 8,703,451 | B2 | 4/2014 | Haas et al. |
| 8,715,521 | B2 | 5/2014 | Shiflett et al. |
| 8,784,537 | B2 | 7/2014 | Seiler et al. |
| 8,809,576 | B2 | 8/2014 | Schraven et al. |
| 8,932,478 | B2 | 1/2015 | Seiler et al. |
| 9,221,007 | B2 | 12/2015 | Rolker et al. |
| 2004/0133058 | A1 | 7/2004 | Arlt et al. |
| 2005/0070717 | A1 | 3/2005 | Wasserscheid et al. |
| 2005/0129598 | A1 | 6/2005 | Chinn |
| 2005/0202967 | A1 | 9/2005 | Hoefer et al. |
| 2005/0245769 | A1 | 11/2005 | Kohler et al. |
| 2006/0104877 | A1 | 5/2006 | Cadours et al. |
| 2006/0150665 | A1 | 7/2006 | Weimer et al. |
| 2006/0197053 | A1 | 9/2006 | Shiflett et al. |
| 2006/0251961 | A1 | 11/2006 | Olbert et al. |
| 2007/0144186 | A1 | 6/2007 | Shiflett et al. |
| 2007/0264180 | A1 | 11/2007 | Carrette et al. |
| 2007/0286783 | A1 | 12/2007 | Carrette et al. |
| 2008/0028777 | A1 | 2/2008 | Boesmann et al. |
| 2008/0283383 | A1 | 11/2008 | Ruffert et al. |
| 2009/0029121 | A1 | 1/2009 | Hammermann et al. |
| 2009/0199709 | A1 | 8/2009 | Rojey et al. |
| 2009/0211447 | A1 | 8/2009 | Lichtfers et al. |
| 2010/0011958 | A1 | 1/2010 | Cadours et al. |
| 2010/0029519 | A1 | 2/2010 | Schwab et al. |
| 2010/0084597 | A1 | 4/2010 | Schwab et al. |
| 2010/0104490 | A1 | 4/2010 | Bouillon et al. |
| 2010/0132551 | A1 | 6/2010 | Bouillon et al. |
| 2010/0288126 | A1 | 11/2010 | Agar et al. |
| 2010/0326126 | A1 | 12/2010 | Seiler et al. |
| 2011/0081287 | A1 | 4/2011 | Bouillon et al. |
| 2011/0094381 | A1 | 4/2011 | Lichtfers et al. |
| 2011/0118504 | A1 | 5/2011 | Haas et al. |
| 2011/0185901 | A1 | 8/2011 | Jacquin et al. |
| 2011/0247494 | A1 | 10/2011 | Dinnage et al. |
| 2011/0256043 | A1 | 10/2011 | Blair et al. |
| 2011/0309295 | A1 | 12/2011 | Joh et al. |
| 2012/0011886 | A1 | 1/2012 | Shiflett et al. |
| 2012/0080644 | A1 | 4/2012 | Seiler et al. |
| 2012/0315366 | A1 | 12/2012 | Zehnacher et al. |
| 2013/0011314 | A1 | 1/2013 | Porcheron et al. |
| 2013/0023712 | A1 | 1/2013 | Porcheron et al. |
| 2013/0031930 | A1 | 2/2013 | Seiler et al. |
| 2013/0031931 | A1 | 2/2013 | Seiler et al. |
| 2013/0118350 | A1 | 5/2013 | Rolker et al. |
| 2013/0219949 | A1 | 8/2013 | Seiler et al. |
| 2013/0327084 | A1 | 12/2013 | Shiflett et al. |
| 2014/0005344 | A1 | 1/2014 | Rinker et al. |
| 2014/0090558 | A1 | 4/2014 | Rolker et al. |
| 2014/0105801 | A1 | 4/2014 | Rolker et al. |
| 2014/0120016 | A1 | 5/2014 | Rolker et al. |
| 2014/0356268 | A1 | 12/2014 | Schraven et al. |
| 2014/0360369 | A1 | 12/2014 | Schraven et al. |
| 2015/0024106 | A1 | 1/2015 | Huller et al. |
| 2015/0175738 | A1 | 6/2015 | Willy et al. |
| 2015/0175740 | A1 | 6/2015 | Willy et al. |
| 2015/0308720 | A1 | 10/2015 | Zehnacker et al. |
| 2015/0321139 | A1 | 11/2015 | Schraven et al. |
| 2016/0045857 | A1 | 2/2016 | Rolker et al. |
| 2016/0175766 | A1 | 6/2016 | Zehnacker |

FOREIGN PATENT DOCUMENTS

| | | |
|---|---|---|
| CN | 102335545 | 2/2012 |
| DE | 400 488 | 8/1924 |
| DE | 633 146 | 7/1936 |
| DE | 737031 | 7/1943 |
| DE | 36 23 680 A1 | 1/1988 |
| DE | 266 799 A1 | 4/1989 |
| DE | 195 11 709 | 10/1996 |
| DE | 103 33 546 | 2/2005 |
| DE | 10 2004 053 167 | 5/2006 |
| DE | 10 2010 004 779 | 7/2011 |
| DE | 10 2011 055 859 | 6/2013 |
| EP | 0 033 529 A1 | 1/1981 |
| EP | 0 047 967 | 9/1981 |
| EP | 0 079 767 | 5/1983 |
| EP | 0 187 130 | 7/1986 |
| EP | 0 302 020 | 2/1989 |
| EP | 0 558 019 | 2/1993 |

(56) References Cited

FOREIGN PATENT DOCUMENTS

| | | |
|---|---|---|
| EP | 2 636 715 | 9/2013 |
| FR | 2 900 841 A1 | 11/2007 |
| GB | 1 306 853 | 2/1973 |
| GB | 1 501 195 | 2/1978 |
| GB | 2 047 681 | 12/1980 |
| JP | 33-009879 B | 11/1958 |
| JP | 61-129019 | 6/1986 |
| JP | 62-73055 | 4/1987 |
| JP | 1-134180 | 5/1989 |
| JP | 2-298767 | 12/1990 |
| JP | 4-268176 | 9/1992 |
| JP | 6-307730 | 11/1994 |
| JP | 7-167521 | 7/1995 |
| JP | 2001-219164 | 8/2001 |
| JP | 2002-047258 | 2/2002 |
| JP | 2004-44945 | 2/2004 |
| JP | 2006-239516 | 9/2006 |
| RU | 2 101 625 | 1/1998 |
| RU | 2 183 003 | 5/2002 |
| WO | WO 93/13367 | 7/1993 |
| WO | WO 00/61698 A1 | 10/2000 |
| WO | WO 02/16671 | 2/2002 |
| WO | WO 2004/082809 | 9/2004 |
| WO | WO 2009/074535 | 6/2009 |
| WO | WO 2009/133059 | 11/2009 |
| WO | WO 2011/131552 | 10/2011 |
| WO | WO 2012/150051 | 11/2012 |
| WO | WO 2013/041300 | 3/2013 |
| WO | WO 2013/050230 | 4/2013 |
| WO | WO 2013/050242 | 4/2013 |
| WO | WO 2013/072147 | 5/2013 |
| WO | WO 2015/000637 | 1/2015 |

OTHER PUBLICATIONS

Chua, et al., "Improved Thermoodynamic Property Fields of LiBr-$H_2$O Solution," *International Journal of Refrigeration* 23:412-429 (Sep. 2000).

De Lucas, et al., "Vapor Pressures, Densities, and Viscosities of the (Water + Lithium Bromide + Lithium Formate) System and (Water + Lithium Bromide + Potassium Formate) System," *Journal of Chemical and Engineering Data, American Chemical Society*, US 48(1):18-22 (Jan. 2003).

De Lucas, et al., "Absorption of Water Vapor into Working Fluids for Absorption Refrigeration Systems," *Industrial & Engineering Chemistry Research, American Chemical Society*, US 46(1):345-350 (2007); (published online Dec. 2006).

Domanska, et al., Solubility of 1-Alkyl-3-ethylimidazolium-Based Ionic Liquids in Water and 1-Oxtanol, *J. Chem. Eng. Data* 53:1126-1132 (Apr. 2008).

Galán, et al., "Solvent Properties of Functionalized Ionic Liquids for $CO_2$ Absorption," *IChemE* 85(A1):31-39 (Jan. 2007).

Glebov, et al., "Experimental Study of Heat Transfer Additive Influence on the Absorption Chiller Performance," *International Journal of Refrigeration* 25:538-545 (Aug. 2002).

Kim, et al., "Surface tension and viscosity of 1-butyl-3-methylimidazolium iodide and 1-butyl-3-methylimidazolium tehafluoroborate, and solubility of lithium bromide+1-butyl-3-methylimidazolium bromide in water," *Korean J. Chem. Eng.* 23(1):113-116 (Jan. 2006).

Kim, et al., "Performance Evaluation of Absorption Chiller Using LiBr + $H_2N(CH_2)_2OH$ + $H_2O$, LiBr + $HO(CH_2)_3OH$ + $H_2O$, and LiBr + ($HOCH_2CH_2NH$ +$H_2O$ as Working Fluids," *Applied Thermal Engineering* 19:217-225 (Feb. 1999).

Kim, et al., "Refractive Index and Heat Capacity of 1-Butyl-3-Methylimidazolium Bromide and 1-Butyl-3-Methylimidazolium Tetrafluoroborate, and Vapor Pressure of Binary Systems for 1-Butyl-3-Methylimidazolium Tetrafluoroborate—Trifluoroethanol," *Fluid Phase Equilibria* 218:215-220 (Apr. 2004).

Li, et al., "Correlation and Prediction of the Solubility of $CO_2$ and $H_2S$ in an Aqueous Solution of 2-Piperidineethanol and Sulfolane," *Ind. Eng. Chem. Res.* 37:3098-3104 (May 1998).

Liu, et al., The physical properties of aqueous solution of room-temperature ionic liquids based on imidazolium:Database and Evaluation, *J Mol. Liquids* 140:68-72 (Jan. 2008).

Mitsubishi Heavy Industries, Ltd., "Flue Gas $CO_2$ Recovery Technology and Its Application to EOR: an Effective Strategy for Addressing the Issues of Global Warming and Peaking Oil Supply," vol. 44, p. 20-23 (2007).

Perez-Blanco, "A Model of an Ammonia-Water Falling Film Absorber," *ASHRAE Transactions* vol. 94, pp. 467-483, 1988; Presented at the winter meeting in Dallas Texas of the American Society of Heating, Refrigerating and Air-Conditioning Engineers, Inc. (1988).

Rolker, et al., "Abtrennung von Kohlendioxid aus Rauchgasen mittels Absorption," *Chemie Ingenieur Technik* 78:416-424; with English language abstract attached (Jul. 2006).

Wasserscheid, et al., "Ionic Liquids—New "Solutions" for Transition Metal Catalysis," *Angew. Chem. Int. Ed.* 39:3772-3789 (Nov. 2000).

Wu, et al., "Novel Ionic Liquid Thermal Storage for Solar Thermal Electric Power Systems," *Proceeding of Solar Forum. Solar Energy: The Power to Choose* (Apr. 21-25, 2001).

Yoon, et al., "Cycle Analysis of Air-Cooled Absorption Chiller Using a New Working Solution," *Energy* 24:795-809 (Sep. 1999).

Zhang, et al., "Screening of ionic Liquids to Capture CO2 by COSMO-RS and Experiments," *AIChE Journal* 54(10):2171-2728 (Oct. 2008).

Zhou, The Vapor Surfactant Theory of Absorption and Condensation Enhancement, *Proc. Int. Sorption Heat Pump Conference*, (Sep. 24-27, 2002).

Ziegler, et al., "Heat-Transfer Enhancement by Additives," *International Journal of Refrigeration* 19:301-309 (Jun. 1996).

Ziegler, et al., "Multi-effect absorption chillers," *Rev. Int. Froid* 16(5):301-311 (1993).

Ziegler, et al., "Recent developments and future prospects of sorption heat pump systems," *Int. J. Therm. Sci.* 38:191-208 (Mar. 1999).

English language translation of Office Action for Chinese application 201280028524.0 (counterpart of copending U.S. Appl. No. 14/124,472) filed in China on May 25, 2012.

"Mutual Solubility of Water and Pyridine Derivatives" by Richard M. Stephenson, *J. Chem. Eng. Data* 38, p. 428-431, ( Jul. 1993).

"Review of Organic Functional Groups: Introduction to Medicinal Organic Chemistry" by Thomas L. Lemke, Lippincott Williams & Wilkins, p. 40 (2003).

"Review of Organic Functional Groups: Introduction to Medicinal Organic Chemistry" by Thomas L. Lemke, Lippincott Williams & Wilkins, p. 39 (2003).

Encylopedia of Chemical Process and Design, Ed. John J. McKetta, vol. 32. Marcel Deckker, Inc. (1990) pp. 122-137.

Canadian Office Action for corresponding CA patent application 2,872,440, dated Apr. 7, 2016.

Luo, et al., "Dehumidification performance of [EMIM]$BF_4$," *Applied Thermal Engineering* 31(14-15):2772-2777 (Oct. 2011).

Luo, et al., "Investigation of feasibility of ionic liquids used in solar liquid desiccant air conditioning system," *Solar Energy* 86(9):2781-2724 (Sep. 2012).

Ionische Flüssigkeiten—Polarität and Wechselwirkungen mit silikatischen Oberflächen, Dissertation Technische Universität Chemnitz (Nov. 2011); with English language translation of pp. 14, 24, 39-41, 48-49 and 111; also sections 2.3.3, 3.1.1 and 5.3.

Projekt der Deutschen Bundesstiftung: Gasreinigung mit ionischen Flüssigkeiten Umwelt; Endbericht (Sep. 2009); with English language translation of pp. 18-23 and 90-92.

Wellner, et al., "Entwässerung ionischer Flüssigkeiten in einem Fallfilmverdampfer," *Chemie Ingenieur Technik* 83(9):1493-1501(Jul. 2011); with complete English language translation.

Yunus, "Gaslöslichkeit in ionischen Flüssigkeiten," IsoSORP Application Note Nr. 4:1-2 (Feb. 2014); with complete English language translation.

Blachly, et al., "Stabilization of Monoethanolmine Solutions in Carbon Dioxide Scrubbers," *J. Chem. Eng. Data* 11(3):401-403 (Jul. 1966).

(56) References Cited

OTHER PUBLICATIONS

Call, "Aminoxyle—eine Klasse stabiler," *Pharmazie in unserer Zeit* 3:83-95 (Jan. 1977); with English language translation attached.
Kirchhoff, et al., "Triacetoneamine Derivatives Industrial Applications and Recent Developments," pp. 1-9, Addcon World '99 (Two-Day Conference, Oct. 1999).
Lewin, et al., "Molecular Features Associated with Polyamine Modulation of NMDA Receptors," *J. Med. Chem.* 41:988-995 (published online Feb. 1998).
Satori, et al., "Sterically Hindered Amines for $CO_2$ Removal from Gases," *Ind. Eng. Chem. Fundam.* 22(2):239-249 (accepted Jan. 1983).
Gerald Scott, Develpoments in polymer stabilization-5, Chapter 3: Antioxidant action of sterically hindered amines and related compounds, Shlyapintokh and Ivanor; pp. 41-70, Applied Science Publishers (1982).
Shao & Stangeland, "Amines Used in $CO_2$ Capture—Health and Environmental Impacts," Bellona Report (Sep. 2009).
Ulmann's Encyclopedia of Industrial Chemistry, 5th Edition, vol. 83, "Antioxidants" pp. 91-104 (1985).

\* cited by examiner

METHOD FOR ABSORBING CO₂ FROM A GAS MIXTURE

CROSS REFERENCE TO RELATED APPLICATIONS

The present application is US national stage of international application PCT/EP2013/058288, which had an international filing date of Apr. 22, 2013. Priority is claimed to German application DE 10 2012 207 509.7, filed on May 7, 2012. These related applications are hereby incorporated by reference.

The invention relates to a method of absorbing $CO_2$ from a gas mixture.

Gas streams which have an undesirable high content of $CO_2$ which has to be reduced for further processing, for transport or for avoiding $CO_2$ emissions occur in numerous industrial and chemical processes.

On the industrial scale, $CO_2$ is typically absorbed from a gas mixture by using aqueous solutions of alkanolamines as an absorption medium. The loaded absorption medium is regenerated by heating, depressurization to a lower pressure or stripping, and the carbon dioxide is desorbed. After the regeneration process, the absorption medium can be used again. These methods are described for example in Rolker, J.; Arlt, W.; "Abtrennung von Kohlendioxid aus Rauchgasen mittels Absorption" [Removal of carbon dioxide from flue gases by absorption] in Chemie Ingenieur Technik 2006, 78, pages 416 to 424, and also in Kohl, A. L.; Nielsen, R. B., "Gas Purification", 5th edition, Gulf Publishing, Houston 1997.

A disadvantage of these methods, however, is that the removal of $CO_2$ by absorption and subsequent desorption requires a relatively large amount of energy and that, on desorption, only a part of the absorbed $CO_2$ is desorbed again, with the consequence that, in a cycle of absorption and desorption, the capacity of the absorption medium is not sufficient.

U.S. Pat. No. 7,419,646 describes a process for deacidifying off-gases in which an absorption medium is used which forms two separable phases upon absorption of the acid gas. 4-Amino-2,2,6,6-tetramethylpiperidine is cited, inter alia, in column 6 as a reactive compound for absorbing an acid gas. The process of U.S. Pat. No. 7,419,646 has the disadvantage that additional apparatus is required for separating the two phases which arise in the absorption.

US 2009/0199709 describes a similar method, in which, following absorption of the acid gas, heating of the loaded absorption medium produces two separable phases which are then separated from one another. Here again, 4-amino-2,2,6,6-tetramethylpiperidine is cited as a reactive compound suitable for the absorption of an acid gas.

FR 2900841 and US 2007/0286783 describe methods for deacidifying off-gases, in which the reactive compound reacted with $CO_2$ is separated from the loaded absorption medium by extraction. One of the reactive compounds cited for the absorption of an acid gas is 4-amino-2,2,6,6-tetramethylpiperidine.

WO 2010/089257 describes a method of absorbing $CO_2$ from a gas mixture using an absorption medium that comprises water and a 4-amino-2,2,6,6-tetramethylpiperidine, which amine can be alkylated on the 4-amino group. However, precipitation of the carbamate salt readily occurs during the absorption of $CO_2$ with absorption media comprising 4-amino-2,2,6,6-tetramethylpiperidine as the absorbent. WO 2010/089257 describes the addition of solvents, such as sulfolane or ionic liquids, in order to maintain the absorption medium single phase and to achieve a higher absorption capacity for $CO_2$.

Therefore, there is still a need for a method of absorbing $CO_2$ from a gas mixture, by which at the same time a high absorption capacity for $CO_2$ can be achieved at a high rate of absorption and in which a separation into two liquid phases or precipitation of a solid during the absorption of $CO_2$ and regeneration of the absorption medium can be avoided even without addition of a solvent.

It has now been found that this object can be achieved by using an absorption medium containing a 4-amino-2,2,6,6-tetramethylpiperidine substituted on the 4-amino group with the substituent on the 4-amino group carrying a suitable functional group which improves water-solubility.

The invention therefore provides a method of absorbing $CO_2$ from a gas mixture by bringing the gas mixture into contact with an absorption medium comprising water and at least one amine of formula (I)

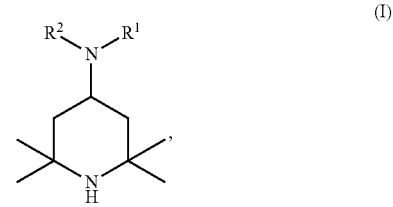

where $R^1$ is a $—(CH_2)_n—(XCH_2CH_2)_m—Y—R^3$ radical where $R^3$=hydrogen or an alkyl radical having from 1 to 6 carbon atoms, X and Y are each, independently of one another, $NR^3$, oxygen, SO or $SO_2$, where in the case of Y=SO and in the case of Y=$SO_2$, $R^3$ is not hydrogen, and Y—$R^3$ can be an N-morpholinyl radical or an N-piperazyl radical, n=2 to 4, m=0 to 4 and $R^2$ is hydrogen, an alkyl radical having from 1 to 6 carbon atoms or a radical $R^1$.

However, m must be different from 0 when $R^2$ is not a radical $R^1$, Y=$NR^3$ and Y—$R^3$ is not an N-morpholinyl radical and not an N-piperazyl radical.

Preferably, X and Y in formula (I) are each, independently of one another, $NR^3$ or oxygen.

In a particularly preferred embodiment, Y in formula (I) is oxygen, and $R^3$ is then particularly preferably methyl or hydrogen. Amines of formula (I) which are particularly suitable for this embodiment are 4-(2-hydroxyethylamino)-2,2,6,6-tetramethylpiperidine where $R^1$=$—(CH_2)_2OH$ and $R^2$=hydrogen, 4-[bis(2-hydroxyethyl)amino]-2,2,6,6-tetramethylpiperidine where $R^1$, $R^2$=$—(CH_2)_2OH$ and $R^2$=hydrogen, 4-(2-methoxyethylamino)-2,2,6,6-tetramethylpiperidine where $R^1$=$—(CH_2)_2OCH_3$ and $R^2$=methyl, and 4-(2-hydroxyethylaminoethylamino)-2,2,6,6-tetramethylpiperidine where $R^1$=$—(CH_2)_2NH(CH_2)_2OH$ and $R^2$=hydrogen.

In a further particularly preferred embodiment, Y—$R^3$ in formula (I) is an N-morpholinyl radical or an N-piperazyl radical. Amines of formula (I) which are particularly suitable for this embodiment are 4-(2-piperazinoethylamino)-2,2,6,6-tetramethylpiperidine where $R^1$=$—(CH_2)_2Y—R^3$ and Y—$R^3$=N-piperazyl and 4-(2-morpholinopropylamino)-2,2,6,6-tetramethylpiperidine where $R^1=\!\!-\!(CH_2)_3Y\!-\!R^3$ and $Y\!-\!R^3\!=\!N$-morpholinyl.

In both particularly preferred embodiments, m in formula (I) is preferably 0.

Preferably, amines of formula (I) in which n=2 or 3, with particular preference being given to n=2, are used in the process of the invention.

Amines of formula (I) can be prepared from commercial triacetone amine by reductive amination, in which triacetone amine is reacted with an amine of formula $R^1R^2NH$ and hydrogen in the presence of a hydrogenation catalyst. To prepare amines of formula (I) which contain a group X or Y=SO or $SO_2$, the reductive amination is preferably carried out using an amine $R^1R^2NH$ which has a sulphur atom in place of the group SO or $SO_2$ and in a subsequent step the thioether group of the resulting product is oxidized to the group SO or $SO_2$ by means of an oxidant. Suitable oxidants for this purpose are hydrogen peroxide, preferably in the presence of a catalyst such as molybdate, and peroxycarboxylic acids, preferably peroxyacetic acid.

In the method of the invention, the content of amines of formula (I) in the absorption medium is preferably from 10 to 60% by weight, particularly preferably from 20 to 50% by weight. The content is here based on the absorption medium without absorbed $CO_2$.

In the method of the invention, in addition to water and amines of formula (I), the absorption medium may further comprise one or more physical solvents which do not lead to any chemical reaction with $CO_2$. The fraction of physical solvents in this case may be up to 50% by weight. Suitable physical solvents (C) include sulfolane, aliphatic acid amides, such as N-formylmorpholine, N-acetylmorpholine, N-alkylpyrrolidones, more particularly N-methyl-2-pyrrolidone, or N-alkylpiperidones, and also diethylene glycol, triethylene glycol and polyethylene glycols and alkyl ethers thereof, more particularly diethylene glycol monobutyl ether. Preferably, however, the absorption medium of the invention contains no physical solvent.

In the method of the invention, the absorption medium may additionally comprise further additives, such as corrosion inhibitors, wetting-promoting additives and defoamers.

All compounds known to the skilled person as suitable corrosion inhibitors for the absorption of $CO_2$ using alkanolamines can be used as corrosion inhibitors in the method of the invention, in particular the corrosion inhibitors described in U.S. Pat. No. 4,714,597. In this case, a significantly lower amount of corrosion inhibitors can be chosen than when using a customary absorption medium containing ethanolamine, since amines of formula (I) are significantly less corrosive towards metallic materials than ethanolamine.

The cationic surfactants, zwitterionic surfactants and nonionic surfactants known from WO 2010/089257 page 11, line 18 to page 13, line 7 are preferably used as wetting-promoting additive.

All compounds known to the skilled person as suitable defoamers for the absorption of $CO_2$ using alkanolamines can be used as defoamers in the method of the invention.

In the method of the invention, the gas mixture may be a natural gas, a methane-containing biogas from a fermentation, composting or a sewage treatment plant, a combustion off-gas, an off-gas from a calcination reaction, such as the burning of lime or the production of cement, a residual gas from a blast-furnace operation for producing iron, a gas stream in a refinery, or a gas mixture resulting from a chemical reaction, such as, for example, a synthesis gas containing carbon monoxide and hydrogen, or a reaction gas from a steam-reforming hydrogen production process. The gas mixture is preferably a combustion off-gas, a natural gas or a biogas.

Before being brought into contact with the absorption medium, the gas mixture preferably has a $CO_2$ content in the range from 0.1 to 60% by volume, particularly preferably in the range from 1 to 40% by volume.

The gas mixture can contain further acid gases from the series COS, $H_2S$, $CH_3SH$ or $SO_2$, in addition to $CO_2$. A combustion off-gas is preferably desulphurized beforehand, i.e. $SO_2$ is removed from the gas mixture by a desulphurization method known from the prior art, preferably by a gas scrub using milk of lime, before the method of the invention is carried out.

For the method of the invention, all apparatus suitable for contacting a gas phase with a liquid phase can be used to contact the gas mixture with the absorption medium.

Preferably, absorption columns or gas scrubbers known from the prior art are used, for example membrane contactors, radial flow scrubbers, jet scrubbers, venturi scrubbers, rotary spray scrubbers, random packing columns, ordered packing columns or tray columns. With particular preference, absorption columns are used in countercurrent flow mode.

In the method of the invention, the absorption of $CO_2$ is carried out preferably at a temperature of the absorption medium in the range from 0 to 80° C., more preferably 20 to 60° C. When using an absorption column in countercurrent flow mode, the temperature of the absorption medium is more preferably 30 to 60° C. on entry into the column, and 35 to 80° C. on exit from the column.

The absorption of $CO_2$ is preferably carried out at a pressure of the gas mixture in the range from 0.5 to 90 bar, particularly preferably from 0.9 to 30 bar. The partial pressure of $CO_2$ in the gas mixture before absorption is preferably in the range from 0.1 to 10 bar. Absorption of $CO_2$ from natural gas is preferably carried out at a pressure of the gas mixture in the range from 5 to 90 bar, particularly preferably from 10 to 80 bar. Absorption of $CO_2$ from a combustion off-gas is preferably carried out at a pressure of the gas mixture in the range from 0.8 to 1.5 bar, particularly preferably from 0.9 to 1.1 bar, in order that the combustion off-gas does not have to be compressed beforehand.

In a preferred embodiment of the method of the invention, $CO_2$ absorbed in the absorption medium is desorbed again by increasing the temperature and/or reducing the pressure and the absorption medium after this desorption of $CO_2$ is used again for absorbing $CO_2$. By such cyclic operation of absorption and desorption, $CO_2$ can be entirely or partially separated from the gas mixture and obtained separately from other components of the gas mixture.

As an alternative to the increase in temperature or the reduction in pressure, or in addition to an increase in temperature and/or a reduction in pressure, it is also possible to carry out a desorption by stripping the absorption medium loaded with $CO_2$ by means of a gas.

If, in the desorption of $CO_2$, water is also removed from the absorption medium, water may be added as necessary to the absorption medium before reuse for absorption.

All apparatus known from the prior art for desorbing a gas from a liquid can be used for the desorption. The desorption is preferably carried out in a desorption column. Alternatively, the desorption of $CO_2$ may also be carried out in one or more flash evaporation stages.

The desorption is carried out preferably at an absorption medium temperature in the range from 50 to 200° C., more particularly 80 to 180° C. The temperature during desorption is then preferably at least 20° C., more preferably at least 50° C., above the temperature during absorption. The absorption is particularly preferably carried out at a temperature in the range from 0 to 80° C. and the desorption is particularly preferably carried out at a higher temperature in the range from 50 to 200° C.

In the case of desorption by lowering the pressure, the desorption of $CO_2$ is preferably carried out at a total pressure in the gas phase in the range from 0.01 to 10 bar, in particular from 0.1 to 5 bar. The pressure in the desorption is preferably at least 1.5 bar below, particularly preferably at least 4 bar below, the pressure in the absorption and is most preferably atmospheric pressure. The absorption is particularly preferably carried out at a pressure in the range from 0.8 to 90 bar and the desorption is carried out at a lower pressure in the range from 0.01 to 10 bar.

The method of the invention makes it possible to achieve, at the same time, a high absorption capacity for $CO_2$ and an absorption rate which is sufficiently high for industrial application by use of amines of formula (I). By the use of amines of formula (I), precipitation of a solid can be reliably prevented in the absorption of $CO_2$, even without addition of a solvent, and phase separation of the absorption medium into two liquid phases can be prevented in the desorption of $CO_2$. The method of the invention can therefore be used without problems in simply constructed plants as are used in the prior art for gas scrubbing using aqueous solutions of ethanolamine and here achieves an improved absorption performance for $CO_2$ in comparison with ethanolamine. In addition, discharge of absorbent in the desorption is lower than in the case of ethanolamine.

In a preferred embodiment of the method of the invention, the desorption is carried out first of all by lowering the pressure in one or more successive flash evaporation stages followed by stripping with an inert gas such as air or nitrogen in a desorption column. In the last flash evaporation stages, the pressure is preferably lowered to 1 to 5 bar, more preferably to 1 to 2 bar. The stripping in the desorption column is preferably carried out at a temperature of the absorption medium in the range from 60 to 100° C. Flash evaporation combined with stripping enables a low residual content of $CO_2$ in the absorption medium after desorption to be achieved with a low energy consumption. Thus the amount of absorption medium required in the overall process may be lowered and the need for thermal energy for the desorption of $CO_2$ may be reduced.

The following examples illustrate the invention without, however, restricting the subject matter of the invention.

EXAMPLES

For determining the $CO_2$ loading, the $CO_2$ uptake and the relative absorption rate, 150 g of absorption medium consisting of 45 g of amine and 105 g of water were charged to a thermostatable container with a top-mounted reflux condenser cooled at 3° C. After heating to 40° C. or 100° C., a gas mixture of 14% $CO_2$, 80% nitrogen and 6% oxygen by volume was passed at a flow rate of 59 l/h through the absorption medium, via a frit at the bottom of the container, and the $CO_2$ concentration in the gas stream exiting the reflux condenser was determined by IR absorption using a $CO_2$ analyser. The difference between the $CO_2$ content in the gas stream introduced and in the exiting gas stream was integrated to give the amount of $CO_2$ taken up, and the equilibrium $CO_2$ loading of the absorption medium was calculated. The $CO_2$ uptake was calculated as the difference in the amounts of $CO_2$ taken up at 40° C. and at 100° C. From the slope of the curve of $CO_2$ concentration in the exiting gas stream for an increase in concentration from 1% to 12% by volume, a relative absorption rate of $CO_2$ in the absorption medium was determined. The amines tested are given in Table 1 with the equilibrium loadings determined in this way at 40° C. and 100° C., in mol $CO_2$/mol amine, the $CO_2$ uptake in mol $CO_2$/mol amine, the relative absorption rate of $CO_2$, relative to Example 1 with 100%, and the boiling point of the amine.

For determining the phase separation temperatures, the absorption medium was heated slowly in a closed, pressure-rated glass container until a clouding or separation into two liquid phases was discernible. An entry marked with the symbol > means that up to that temperature there was no demixing and that the experiment was ended at the temperature indicated, for safety reasons.

The abbreviations used in Table 1 have the following meanings:
MEA: ethanolamine
TAD: 4-amino-2,2,6,6-tetramethylpiperidine
Pr-TAD: 4-(n-propylamino)-2,2,6,6-tetramethylpiperidine
Bu-TAD: 4-(n-butylamino)-2,2,6,6-tetramethylpiperidine
amine 1:
4-(2-hydroxyethylamino)-2,2,6,6-tetramethylpiperidine
amine 2:
4-(2-methoxyethylamino)-2,2,6,6-tetramethylpiperidine
amine 3:
4-(2-hydroxyethylaminoethylamino)-2,2,6,6-tetramethylpiperidine
amine 4:
4-[bis(2-hydroxyethyl)amino]-2,2,6,6-tetramethylpiperidine
amine 5:
4-(2-piperazinoethylamino)-2,2,6,6-tetramethylpiperidine
amine 6:
4-(2-morpholinopropylamino)-2,2,6,6-tetramethylpiperidine

TABLE 1

| Example | Amine | Loading at 40° C. in mol/mol | Loading at 100° C. in mol/mol | $CO_2$ uptake in mol/mol | Relative absorption rate in % | Boiling point of amine in ° C. at pressure (in mbar) | Phase separation temperature in ° C. |
|---|---|---|---|---|---|---|---|
| 1* | MEA | 0.45 | 0.22 | 0.23 | 100 | 69 (10) | n.d. |
| 2* | TAD | ** | 0.54 | ** | ** | 79 (10) | n.d. |
| 3* | Pr-TAD | 1.53 | 0.39 | 1.14 | 41 | 102 (14) | 70 |
| 4* | Bu-TAD | 1.38 | 0.20 | 1.18 | 50 | 251 (1013) | 45 |
| 5 | Amine 1 | 1.15 | 0.39 | 0.76 | 27 | 142 (11) | >90 |
| 6 | Amine 2 | 1.13 | 0.33 | 0.80 | 34 | 117 (12) | 116 |
| 7 | Amine 3 | 1.56 | 0.64 | 0.92 | 52 | 166 (3) | >120 |

TABLE 1-continued

| Example | Amine | Loading at 40° C. in mol/mol | Loading at 100° C. in mol/mol | $CO_2$ uptake in mol/mol | Relative absorption rate in % | Boiling point of amine in ° C. at pressure (in mbar) | Phase separation temperature in ° C. |
|---|---|---|---|---|---|---|---|
| 8 | Amine 4 | 1.14 | 0.37 | 0.77 | 28 | 194 (10) | >90 |
| 9 | Amine 5 | 1.70 | 0.79 | 0.91 | 75 | 123 (5) | >145 |
| 10 | Amine 6 | 1.26 | 0.29 | 0.97 | 89 | 113 (1) | 124 |

*not according to the invention
** solid precipitated during introduction of gas
n.d. not determined In addition, the corrosion rate of the steel C22 (material number 1.0402) in contact with the absorption medium was determined for the absorption media of Examples 1 and 8 by measurement of the potentiodynamic polarization resistance and interpretation via a Tafel plot using the method ASTM G59-97 (2009). The results are shown in Table 2.

TABLE 2

| Example | Amine | Corrosion rate in mm/year |
|---|---|---|
| 1 | MEA | 1.99 |
| 8 | Amine 4 | 0.19 |

The invention claimed is:

1. A method of absorbing $CO_2$ from a gas mixture by contacting the gas mixture with an absorption medium wherein the absorption medium comprises water and at least one amine of formula (I):

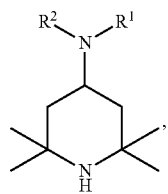

where
$R^1$ is a —$(CH_2)_n$—$(XCH_2CH_2)_m$—Y—$R^3$ radical where $R^3$=hydrogen or an alkyl radical having from 1 to 6 carbon atoms,
X and Y are each, independently of one another, $NR^3$, oxygen, SO or $SO_2$, where in the case of Y=SO and in the case of Y=$SO_2$, $R^3$ is not hydrogen, and Y—$R^3$ can be an N-morpholinyl radical or an N-piperazyl radical,
n=2 to 4,
m=0 to 4 and
$R^2$ is hydrogen, an alkyl radical having from 1 to 6 carbon atoms or a radical $R^1$, where m is different from 0 when $R^2$ is not a radical $R^1$, Y=$NR^3$ and Y—$R^3$ is not an N-morpholinyl radical and not an N-piperazyl radical.

2. The method of claim 1, wherein X and Y in formula (I) are each, independently of one another, $NR^3$ or oxygen.

3. The method of claim 2, wherein Y in formula (I) is oxygen.

4. The method of claim 3, wherein $R^3$ in formula (I) is methyl or hydrogen.

5. The method of claim 3, wherein m in formula (I) is 0.

6. The method of claim 1, wherein Y—$R^3$ in formula (I) is an N-morpholinyl radical or an N-piperazyl radical.

7. The method of claim 6, wherein m in formula (I) is 0.

8. The method of claim 1, wherein n in formula (I) is 2 or 3.

9. The method of claim 8, wherein n in formula (I) is 2.

10. The method of claim 1, wherein the absorption medium has a content of amines of formula (I) of from 10 to 60% by weight.

11. The method of claim 10, wherein the absorption medium has a content of amines of formula (I) of from 20 to 50% by weight.

12. The method of claim 1, wherein the gas mixture is a combustion off-gas, a natural gas or a biogas.

13. The method of claim 1, wherein $CO_2$ absorbed in the absorption medium is desorbed again by an increase in temperature, a reduction of pressure or both and after this desorption of $CO_2$ the absorption medium is used again for absorbing $CO_2$.

14. The method of claim 13, wherein the absorption is carried out at a temperature in the range from 0 to 80° C. and the desorption is carried out at a higher temperature in the range from 50 to 200° C.

15. The method of claim 13, wherein the absorption is carried out at a pressure in the range from 0.8 to 90 bar and the desorption is carried out at a lower pressure in the range from 0.01 to 10 bar.

16. The method of claim 1, wherein said amine of formula (I) is selected from the group consisting of 4-(2-hydroxyethylamino)-2,2,6,6-tetramethylpiperidine, 4-[bis(2-hydroxyethy)amino]-2,2,6,6-tetramethylpiperidine, 4-(2-methoxyethylamino)-2,2,6,6-tetramethylpiperidine, 4-(2-hydroxyethylaminoethylamino)-2,2,6,6-tetramethylpiperidine, 4-(2-piperazinoethylamino)-2,2,6,6-tetramethylpiperidine and 4-(2-morpholinopropylamino)-2,2,6,6-tetramethylpiperidine.

* * * * *